Jan. 29, 1963  H. L. GREENE  3,076,186
SLEEP ALARM HEADPIECE
Filed March 29, 1961

INVENTOR.
HAROLD L. GREENE
BY
*LeBlanc and Shur*
ATTORNEYS

United States Patent Office 3,076,186
Patented Jan. 29, 1963

3,076,186
SLEEP ALARM HEADPIECE
Harold L. Greene, 2450 SW. 7th St., Fort Lauderdale, Fla.
Filed Mar. 29, 1961, Ser. No. 99,079
11 Claims. (Cl. 340—279)

This invention relates to alarm devices for automobile drivers for alerting them to the possibility of falling asleep and more particularly it relates to an alarm device associated with some type of hat to be worn by the driver.

While it has been previously proposed to provide alarm devices of the foregoing type for use by automobile drivers, these devices have suffered from a number of disadvantages which have prevented their use on any substantial scale. Among these defects have been the lack of detachability, excessive weight, lack of a means to adjust the point of alarm actuation of the unit for the particular angle at which the driver prefers to wear his hat, unsuitability for use with hats of different types, particularly caps, and relatively high cost of manufacture.

According to the present invention an alarm device is provided which may be used with either a brim type hat or a cap and which is readily detachable. The unit is designed to permit lot cost manufacture using plastic molding techniques and provides for easy adjustability of the angle at which the alarm is energized. According to one embodiment of the invention the alarm device is combined with the visor of a cap in a novel fashion to minimize the feeling of added weight in the cap while at the same time providing easy removability.

It is accordingly a primary object of the present invention to provide an improved alarm device which may be detachably attached to a hat to sound an alarm whenever the hat is tilted by a predetermined amount.

It is another object of the present invention to provide an alarm device of the foregoing type including a mercury switch adjustably mounted in the device in novel fashion to permit adjustment of the angle at which the alarm is energized.

It is another object of the invention to provide a device of the foregoing type which may be attached to the hat by means of a portion of an on-off switch.

It is still another object of the present invention to provide a unique combination of an alarm device and a cap whereby the alarm device is attached to the visor of the cap and is so formed as to place the weight of the device immediately adjacent the point at which the visor of the cap joins the cap.

It is a still further object of the invention to provide an alarm device which is associated with a cap atop the visor thereof wherein the alarm device is mounted in an open bottom container to permit ready access to the contents thereof and to provide maximum noise for alerting the wearer of the cap.

These and further objects and advantages of the invention will become more apparent upon reference to the following specification and claims and the appended drawings wherein:

Figure 1:
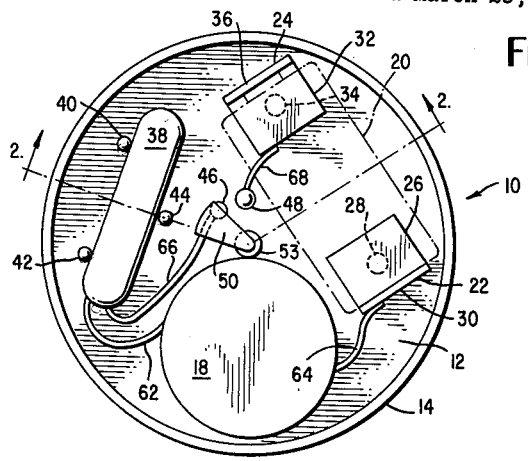
FIGURE 1 is a bottom view of an alarm device constructed according to one embodiment of the invention.
Figure 2:
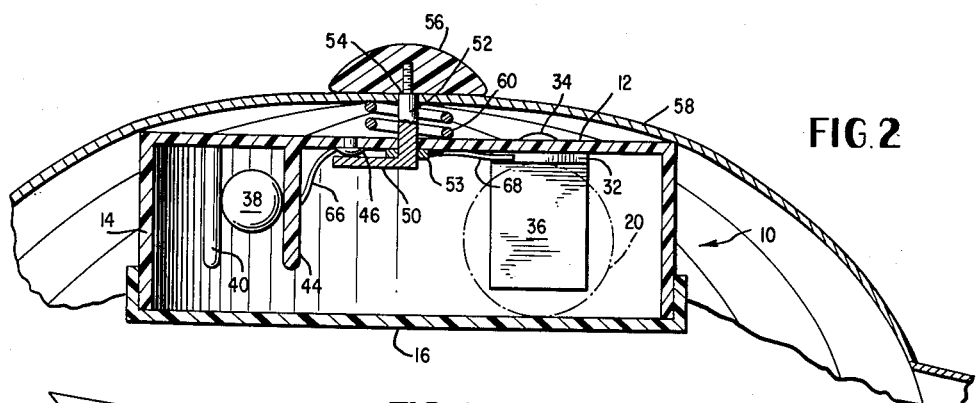
FIGURE 2 is a vertical cross-section of the alarm device of FIGURE 1 taken along the line 2—2 of FIGURE 1.

Referring to FIGURES 1 and 2 there is seen an alarm device indicated generally at 10 comprising an inverted cup-shaped container having a bottom 12 and cylindrical side wall 14. The open end of the container is closed by a friction fitting cover 16 as is best seen in FIGURE 2. The container and cover are preferably formed of a plastic material.

Referring to FIGURE 1, a small buzzer 18 is fastened to the bottom 12 of the container in any suitable fashion, such as by means of a rivet. A dry cell battery indicated in phantom at 20 is held in the container by means of a pair of battery clips 22 and 24. The battery clip 22 comprises a support plate 26 secured to the bottom 12 of the container by means of a rivet 28, and an upright contact plate 30. The battery clip 24 is similarly comprised of a support plate 32 secured to the bottom 12 of the container by a rivet 34 and having an upright contact plate 36.

A tubular mercury switch 38 is adjustably mounted within the container by means of three substantially parallel upstanding fingers 40, 42, and 44 which frictionally engage the mercury tube. This three-prong support insures secure mounting of the mercury tube while permitting the tube to be tilted relative to the bottom 12 of the container in order to set the angle at which the buzzer 18 will be energized.

A pair of switch contacts 46 and 48 are frictionally mounted in apertures in the bottom 12 of the container and cooperate with a contact plate 50 carried by a switch shaft 52 best seen in FIGURE 2. The contact plate 50 may be welded, soldered or brazed to the switch shaft 52, or alternatively, the switch shaft 52 may be integrally formed with the contact plate 50 as by bending over and flattening one end of the switch shaft 52. The shaft 52 passes through a thickened portion 53 of the container bottom 12 to prevent rocking of the shaft relative to the container bottom in any manner which might render the switch action unreliable. It will be obvious that the entire bottom 12 could alternatively be formed of a greater thickness of material, but the illustrated construction results in greater economy.

The upper end of the switch shaft 52 is of a reduced diameter to provide a shoulder 54 and is threaded to receive a switch knob 56 which may be formed with the appearance of the conventional button on top of a cap. The switch shaft 52 passes through an opening in the top of the cap 58 to secure the alarm device to the cap. If desired a metal grommet may be provided in this aperture in the cap. A coil spring 60 is mounted about the switch shaft 52 between the upper surface of the container bottom 12 and the undersurface of the cap 58 to insure good electrical contact between the contact plate 50 and the switch contacts 46 and 48.

One lead 62 from the buzzer 18 is connected to one terminal of the mercury switch 38 while the other lead 64 from the buzzer 18 is connected to the battery clip 22. The other lead 66 of the mercury switch 38 is connected to switch contact 46. Switch contact 48 is connected to a battery coil 24 by means of a lead 68.

With the switch plate 50 in the position shown in FIGURE 1, the alarm device is turned off so that it will not energize the buzzer on electrical closure of the contacts in the mercury tube 38. By rotating the knob 56 the switch plate 50 may be caused to bridge the contacts 46 and 48 to turn the unit on so that upon tilting of the unit the buzzer will be caused to sound when the contacts in the mercury switch are electrically closed. The angle at which the buzzer is energized may be adjusted by moving one or the other end of the mercury tube 38 up or down between the parallel fingers 40, 42, and 44 which, because of their parallelism, will securely fasten the mercury tube in position at all angles of adjustment.

The alarm device illustrated in FIGURES 1 and 2 may be readily removed from the cap by threadably removing the knob 56 from the switch shaft 52. Access to the interior of the container of the alarm device is easily had by removing the frictionally mounted cap 16 and the alarm device may be remounted in the hat by holding the bottom 12 of the container and contact plate 50 in position while the knob 56 is threadably replaced upon the switch shaft 52.

Figure 3:
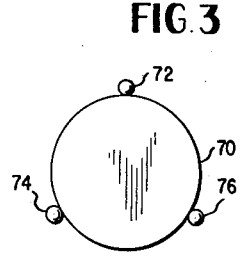
FIGURE 3 is a bottom view of a modified mercury switch for use in the alarm device of FIGURES 1 and 2.

While the alarm device of FIGURES 1 and 2 shows the use of a tube-type mercury switch which is sensitive to tilt in one plane, it is also a feature of the invention that a disc type mercury switch may be utilized to provide sensitivity to tilt in any direction. The mounting of such a disc type switch is shown in FIGURE 3. In that figure a disc-type switch 70 is held in position by means of three fingers 72, 74, and 76 which are spaced approximately 120° apart about the switch and which extend in parallel relationship from the bottom of a container. The switch itself may be of a type shown in United States Patent No. 2,713,159.

Figure 4:
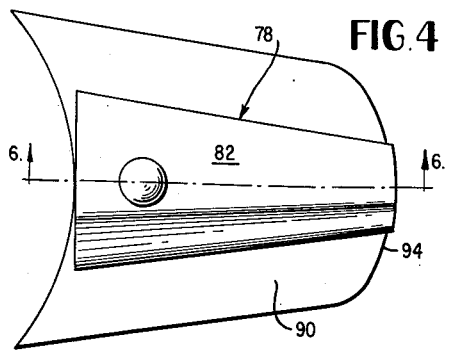
FIGURE 4 is a plan view showing another embodiment of the alarm device of the invention mounted in place on the visor of a cap.
Figure 6:
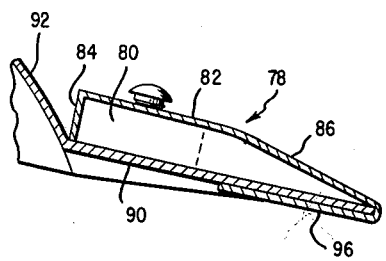
FIGURE 6 is a partial cross-section of the alarm device of FIGURE 4 taken along the line 6—6 of FIGURE 4.
Figure 5:
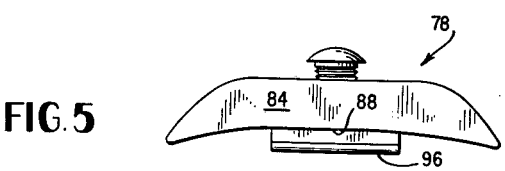
FIGURE 5 is a rear elevation of the alarm device of FIGURE 4.

According to another embodiment of the invention illustrated in FIGURES 4 through 6, the alarm device may be mounted in an elongated container indicated generally at 78. The components of the alarm device may be similar to those shown in FIGURES 1–3 and are contained at one end of the container 78 at the position indicated at 80 in FIGURE 6.

According to this embodiment of the invention the container 78 comprises an open bottom plastic cup having a top 82, rear wall 84 and downwardly tapering forward wall 86. The rear wall 84 has an arcuate lower edge 88 adapted to conform to the shape of the visor 90 of a cap 92. The width of the container decreases toward the front 94 of the visor and the container has no bottom so as to permit easy access to its contents to permit battery changing and adjustment of the mercury switch.

Attached to the front edge of the container 78 is an integral clip member 96 which frictionally holds the container on the visor 90. The upper surface of the clip member 96 may be roughened to insure a firm and stable mounting for the alarm device.

It will be apparent that the alarm device of the embodiment of the invention illustrated in FIGURES 4 through 6 may be readily attached and detached from the peak of any cap. Since the components of the unit are mounted immediately adjacent the cap 92 the weight is carried close to the head of the cap wearer to minimize the feeling of increased weight when the cap is in use. The unit may be attached without altering, in any way, the construction of the cap or modifying its appearance for use without the alarm device.

It will be apparent from the foregoing that the alarm device of this invention may be manufactured at low cost from readily available materials. The on-off switch is of a construction which is extremely economical while providing good reliability of operation. Due to the novel mounting of the mercury switch it is possible to adjust the tilt at which the alarm is sounded while preserving economy in manufacture.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An alarm device comprising a container including a battery, an alarm, an on-off switch and an actuating switch, said battery, alarm and switches being electrically connected to cause said alarm to sound when said switches are closed, said actuating switch comprising a mercury switch, said mercury switch being adjustably mounted in said container by frictional engagement with three parallel members which are attached to said container, said three parallel members comprising three prongs formed integrally with a wall of said container and extending therefrom substantially parallel to one another.

2. An alarm device as set out in claim 1 wherein said actuating switch comprises an elongated mercury tube frictionally held between said prongs with two prongs on one side thereof and one prong on the other side thereof whereby the position of said tube relative to said container may be adjusted.

3. An alarm device as set out in claim 1 wherein said actuating switch comprises a disk shaped mercury switch and said prongs are positioned approximately 120° apart about said switch whereby the position of said tube relative to said container may be adjusted.

4. An alarm device as set out in claim 1 wherein said container includes an integral clip portion for attaching said alarm device to the peak of a cap type hat.

5. An alarm device as set out in claim 4 wherein said container comprises an inverted concave cup, said battery, alarm and switches being held in said cup, said cup having an open bottom for mounting over said peak, said clip portion extending from said cup on the top of said peak, around said peak and under said peak, for removably securing said alarm device to said cap type hat.

6. An alarm device comprising: a container; a battery, an alarm, an on-off switch and an actuating switch, each mounted on said container and being electrically connected to cause said alarm to actuate when said switches are closed; three parallel mounting members mounted on said container; said actuating switch comprising a mercury switch which is adjustably mounted on said container by frictional engagement with said mounting members; said on-off switch comprising an actuator member and contacts; said actuator member, when actuated, engages said contacts and causes said on-off switch to close; and said mercury switch, when moved to a predetermined postion, causing said actuating switch to close.

7. An alarm device for a hat comprising: a container; a battery, an alarm, an on-off switch and an actuating switch, each mounted on said container and being electrically connected to cause said alarm to actuate when said switches are closed; three parallel mounting members mounted on said container; said actuating switch comprising a mercury switch which is adjustably mounted on said container by frictional engagement with said mounting members; a rotatable rod having a first and second end and adapted to have said first end extend through a hat and said second end extend through said container; a rotatable knob; said knob being threadably attached to said first end of said rod; a coil spring positioned about said rod and between said container and said hat; a contact member connected to said second end of said rod and positioned within said container; said knob and rod, when rotated, causing said contact member to close said on-off switch; and said mercury switch, when moved to a predetermined postion, causing said actuating switch to close.

8. An alarm device in accordance with claim 6 wherein: said mercury switch is disc shape; and said parallel mounting members are positioned approximately 120° apart about said disc shaped mercury switch for providing relative adjustability between said disc shaped mercury switch and said container.

9. An alarm device for a cap having a visor comprising: a cup shaped housing; a battery, an alarm, an on-off switch and an actuating switch, each mounted on said housing and being electrically connected to cause said alarm to actuate when said switches are closed; three parallel mounting members mounted on said housing; said actuating switch comprising a mercury switch which is adjustably mounted on said housing by frictional engagement with said mounting members; a rotatable rod having a first and second end and adapted to have said second end extend through said housing; a rotatable knob threadably engaging said first end of said rod; a coil spring positioned about said rod and between said housing and said knob; a contact member connected to said second end of said rod and positioned within said housing; said knob and said housing, when rotated, causing said contact members to close said on-off switch; said mercury switch, when moved to a predetermined position, causing said actuating switch to close; and said housing having an open bottom adjacent the top of said visor and having a clip member extending around and underneath said visor for removably securing said alarm device to said cap.

10. An alarm device in accordance with claim 9 wherein: said housing being spaced from the outer periphery of said visor so that the weight of said alarm device is immediately adjacent the cap wearer's head.

11. An alarm device in accordance with claim 10 wherein: said mercury switch is disc shaped; and said parallel mounting members being positioned approximately 120° apart about said disc shaped mercury switch for providing relative adjustability between said disc shaped mercury switch and said container.

References Cited in the file of this patent

UNITED STATES PATENTS

| | | |
|---|---|---|
| 1,391,782 | McDonald | Sept. 27, 1921 |
| 2,754,497 | Wolpert | July 10, 1956 |
| 2,762,476 | Gaylord | Sept. 11, 1956 |